US012090015B1

(12) United States Patent
Li

(10) Patent No.: US 12,090,015 B1
(45) Date of Patent: Sep. 17, 2024

(54) ELECTRIC TOOTHBRUSH REPLACEMENT HEAD DEVICE

(71) Applicant: Mingfeng Li, Gaozhou (CN)

(72) Inventor: Mingfeng Li, Gaozhou (CN)

( * ) Notice: Subject to any disclaimer, the term of this patent is extended or adjusted under 35 U.S.C. 154(b) by 0 days.

(21) Appl. No.: 18/519,114

(22) Filed: Nov. 27, 2023

(51) Int. Cl.
| | |
|---|---|
| *A61C 17/22* | (2006.01) |
| *A46B 3/02* | (2006.01) |
| *A46B 5/00* | (2006.01) |
| *A46B 7/04* | (2006.01) |
| *A46B 9/04* | (2006.01) |
| *A46B 13/02* | (2006.01) |

(52) U.S. Cl.
CPC .............. *A61C 17/222* (2013.01); *A46B 3/02* (2013.01); *A46B 5/0095* (2013.01); *A46B 7/04* (2013.01); *A46B 9/04* (2013.01); *A46B 13/02* (2013.01); *A61C 2201/00* (2013.01)

(58) Field of Classification Search
CPC ....... A61C 17/222; A46B 5/0095; A46B 3/02; A46B 7/04; A46B 9/04; A46B 13/02
See application file for complete search history.

(56) References Cited

U.S. PATENT DOCUMENTS

| | | | | |
|---|---|---|---|---|
| 11,071,613 B1 * | 7/2021 | Zhou | .................... | A61C 17/222 |
| 2015/0082560 A1 * | 3/2015 | Graeve | ................ | A61C 17/222 15/22.1 |
| 2022/0039545 A1 * | 2/2022 | Kuang | ................. | A46B 5/0095 |
| 2022/0071380 A1 * | 3/2022 | Huang | ................. | A46B 5/0095 |

FOREIGN PATENT DOCUMENTS

| | | | | |
|---|---|---|---|---|
| CN | 113081355 A | * | 7/2021 | ........... A61C 17/222 |
| CN | 219782796 U | * | 10/2023 | |

\* cited by examiner

*Primary Examiner* — Shay Karls
(74) *Attorney, Agent, or Firm* — WPAT, PC

(57) ABSTRACT

An electric toothbrush replacement head device includes: a toothbrush replacement head. The toothbrush replacement head includes: a toothbrush handle and a toothbrush head, a bottom of the toothbrush handle defines a bottom hole, the toothbrush head includes: a brush component, and the brush component includes: bristles. The toothbrush handle is provided with a hollow fixing column therein, which is located at a lower end of the toothbrush handle, a middle part of the fixing column is provided with an elastic sheet, and a bottom of the fixing column defines a mounting hole. A new type of the electric toothbrush replacement head device with a simpler structure, more flexible assembly and disassembly, more convenient use, better teeth cleaning effect, and stronger stability is provided.

16 Claims, 5 Drawing Sheets

ELECTRIC TOOTHBRUSH REPLACEMENT HEAD DEVICE

TECHNICAL FIELD

The disclosure relates to the field of electric toothbrush technologies, and particularly to an electric toothbrush replacement head device.

BACKGROUND

Electric toothbrushes typically include removable and replaceable attachment brushes, also known as "replacement heads", allowing a common handle to be used by multiple family members, each with an independent replacement head. Moreover, it is only necessary to replace the replacement head rather than an entire electric toothbrush including the handle when the brush head needs to be replaced such as the brush head is worn.

During the process of brushing teeth, various forces must be transmitted through a connection between the replacement head and the handle during the brushing operation. These forces specifically include a cleaning force, a driving force, an axial force, and a radial force acting on the replacement head and/or the handle. The connection between the replacement head and the handle is usually achieved in such a way that the radial force is absorbed or dissipated in the handle, while the axial force is absorbed or dissipated in a drive shaft. For this purpose, a tubular connector of the replacement head is usually pushed onto a connecting rod or a neck of the toothbrush, and a drive shaft disposed in a brush tube of the replacement head is connected to a drive shaft protruding from an end of the connecting rod of the handle.

The electric toothbrushes have been widely used due to their high efficiency, portability, and excellent cleaning effect. The existing electric toothbrushes mostly use the rapid rotation of the motor to drive the toothbrush head to vibrate, ensuring good cleaning effect, but internal structures of the existing electric toothbrushes are complex, excessive components bring corresponding costs to the production and processing processes of the existing electric toothbrushes, and the overall damage rate of the toothbrush is high. In addition, the high-speed rotation of the motor drives the toothbrush head to vibrate through the transmission components, and the instability of the internal structure can easily cause structural damage, thereby affecting the normal use of the electric toothbrushes and causing poor teeth cleaning effect.

At present, the electric toothbrush head on the market includes a toothbrush handle, a toothbrush head, and a tail plug. The structure of the existing electric toothbrush head is unreasonable, resulting in inconvenient disassembly, poor stability, poor teeth cleaning effect, and inconvenient use. Therefore, consumers hope to have an electric toothbrush that is more convenient, stable, and effective in cleaning teeth.

SUMMARY

The disclosure aims to provide a new type of an electric toothbrush replacement head device with a simpler structure, more flexible assembly and disassembly, more convenient use, better teeth cleaning effect, and stronger stability.

In order to achieve the above objectives, the disclosure provides an electric toothbrush replacement head device including a toothbrush replacement head. The toothbrush replacement head includes a toothbrush handle and a toothbrush head, a bottom of the toothbrush handle defines a bottom hole, the toothbrush head includes a brush component, and the brush component includes bristles. The toothbrush handle is provided with a hollow fixing column therein located at a lower end of the toothbrush handle, a middle part of the fixing column is provided with an elastic sheet, and a bottom of the fixing column defines a mounting hole.

In an embodiment, the brush component defines inserting bristle holes and includes fused adhesive columns.

In an embodiment, the toothbrush head defines a brush installation slot, a size and a shape of the brush installation slot are corresponding to a size and a shape of the brush component, and the brush component is disposed inside the brush installation slot.

In an embodiment, the electric toothbrush replacement head device further includes: an ultrasonic line disposed in the brush installation slot, and the toothbrush head defines an overflow slot located below the ultrasonic line.

In an embodiment, the elastic sheet is provided with elastic sheet protrusions thereon.

In an embodiment, two sides of the elastic sheet are provided with hollow structures.

In an embodiment, the hollow structures are filled with a soft thermoplastic rubber (TPE).

In an embodiment, a metal ring is disposed on the bottom of the toothbrush handle.

In an embodiment, the toothbrush handle defines clamping slots located at two sides of the bottom hole, and the metal ring is connected to the bottom hole through the clamping slots.

In an embodiment, the metal ring is in a disc shape, and the metal ring is provided with a circular table, the circular table defines a through hole, and two ends of the metal ring are respectively connected to the clamping slots at the two sides of the bottom hole in a snap-fit manner.

The beneficial effects of the disclosure are as follows:

1. Compared with the prior art, the replacement head of the electric toothbrush of the disclosure discards the tail plug, making the structure of the toothbrush head simpler, greatly reducing production costs, making it easier to use, safer, and more reliable.

2. The disclosure reduces the pollution caused by rusting of copper sheets with a copper bristle implantation technology by using the copper-free bristle implantation technology, which is more conducive to human health.

3. The toothbrush handle of the disclosure includes a fixing column, the fixing column is provided with an elastic sheet therein, the elastic sheet is used to compress a shaft core of a main machine to transmit power from the shaft core, making the vibration transmission of the main machine more direct and efficient, with stronger stability, and stronger teeth cleaning effects.

4. The disclosure uses the soft TPE as a filling material to fill the elastic shell structure, which has a complete appearance and strengthens the protection of the shell, making it sturdy and durable.

BRIEF DESCRIPTION OF DRAWINGS

In order to provide a clearer explanation of the embodiments of the disclosure or the technical solutions in the prior art, a brief introduction will be given to the attached drawings required in the description of the embodiments or the prior art. It is apparent that the attached drawings in the following description are only some of the embodiments of the disclosure. For those skilled in the art, other attached drawings can be obtained based on these drawings without any creative labor.

Figure 1:
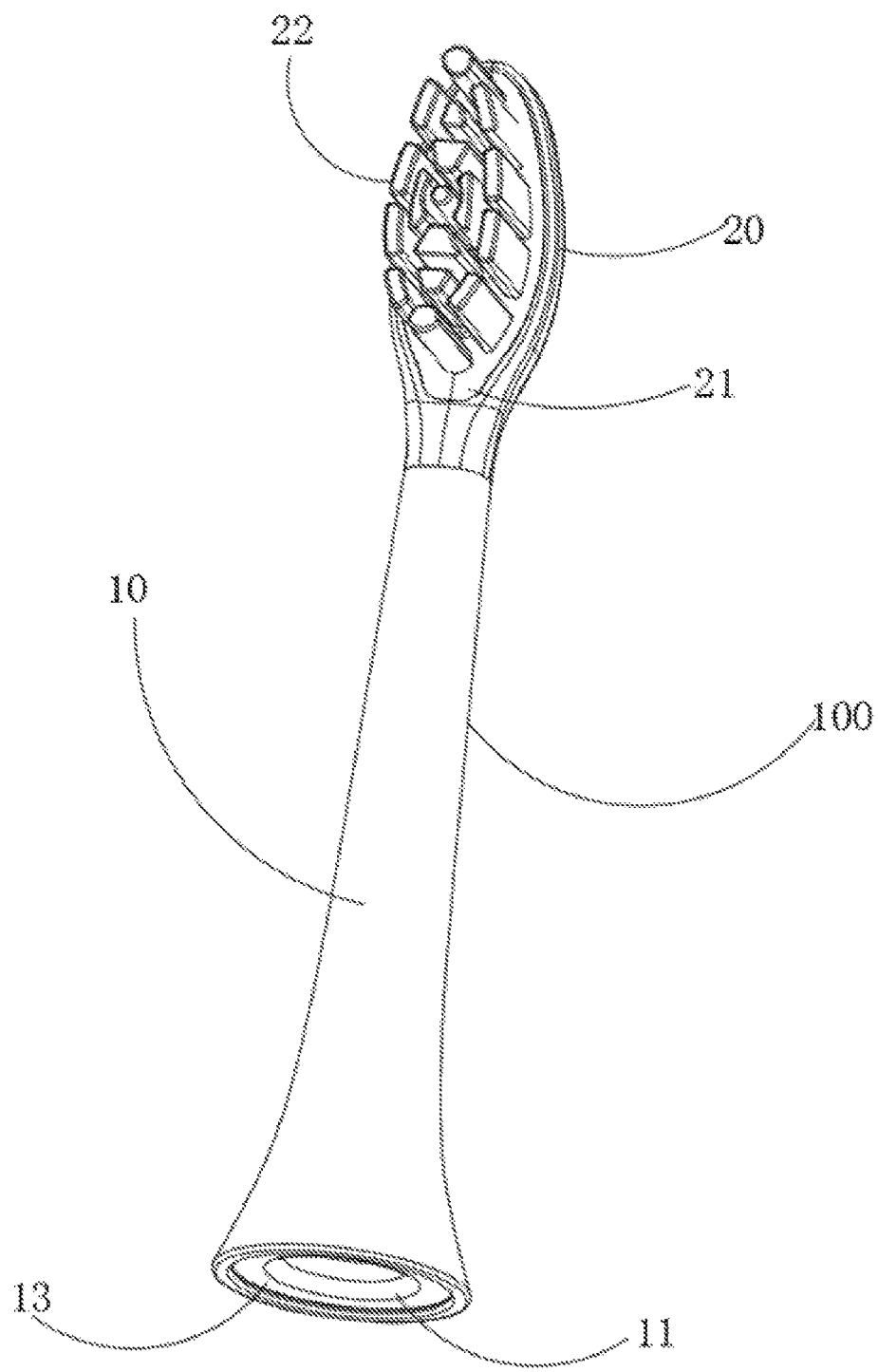
FIG. 1 illustrates a schematic structural diagram of an electric toothbrush replacement head device in an embodiment of the disclosure.

In attached drawings, description of reference signs is listed as follows:

100. toothbrush replacement head; 10. toothbrush handle; 11. bottom hole of the toothbrush handle; 111. first clamping slot; 112. second clamping slot; 12. fixing column; 121. mounting hole; 122. elastic sheet; 1221. elastic sheet protrusion; 1222. hollow structure; 1223. TPE; 13. metal ring; 131. circular table; 132. through hole; 20. toothbrush head; 201. brush installation slot; 202. ultrasonic line; 203. overflow slot; 21. brush component; 211. inserting bristle hole; 212. fused adhesive column; 22. bristle; 30. main machine; 31. shaft core.

The implementation, functional features, and advantages of the disclosure will be further explained in conjunction with the embodiments, with reference to the attached drawings.

DETAILED DESCRIPTION OF EMBODIMENTS

The following will provide a clear and complete description of the technical solution in the embodiment of the disclosure in conjunction with the attached drawings. Apparently, the described embodiment is only a part of the embodiments of the disclosure, not all of them. Based on the embodiment in the disclosure, all other embodiments obtained by those skilled in the art without creative labor fall within the scope of protection of the disclosure.

It should be noted that all directional indications (such as up, down, left, right, front and rear) in the embodiment of the disclosure are only used to explain the relative position relationship and motion situation between components in a specific posture (as shown in the attached drawings). If the specific posture changes, the directional indication also changes accordingly.

In the disclosure, unless otherwise clearly defined and limited, the terms "connect", and "fix" should be understood broadly, for example, "fix" can be a fixed connection, a detachable connection, a whole connection, a mechanical connection or an electrical connection, a direct connection or an indirect connection through an intermediate medium, can be an internal connection between two components or the interaction relationship between two components, unless otherwise specified. For those skilled in the art, the specific meanings of the above terms in the disclosure can be understood based on specific circumstances.

Furthermore, if the embodiment of the disclosure contains descriptions involving "first" and "second", the descriptions of "first" and "second" are used only for descriptive purposes and are not to be construed as indicating or implying their relative importance or implicitly specifying the number of technical features indicated. As a result, a feature defined as "first" and "second" may include at least one such feature either explicitly or implicitly. In addition, the meaning of "and/or" appearing in the entire text includes three parallel schemes. Taking "A and/or B" as an example, it includes scheme A, or scheme B, or scheme including A and B. Furthermore, the technical solutions between various embodiments can be combined with each other, but must be based on the ability of those skilled in the art to achieve. When the combination of technical solutions conflicts or cannot be achieved, it should be considered that the combination of such technical solutions does not exist and is not within the protection scope required by the disclosure.

An electric toothbrush replacement head device is provided.

Embodiment 1

In an embodiment, as shown in FIGS. 1 to 6, the electric toothbrush replacement head device includes: a toothbrush replacement head 100. The toothbrush replacement head 100 includes: a toothbrush handle 10 and a toothbrush head 20, a bottom of the toothbrush handle 10 defines a bottom hole 11, the toothbrush head 20 includes: a brush component 21, and the brush component 21 includes: bristles 22. The toothbrush handle 10 is provided with a hollow fixing column 12 therein, which is located at a lower end of the toothbrush handle 10, a middle part of the fixing column 12 is provided with an elastic sheet 122, and a bottom of the fixing column 12 defines a mounting hole 121.

In the embodiment, as shown in FIGS. 1 to 3, and 6, the bottom of the toothbrush handle 10 is provided with a main machine 30 for installing an electric toothbrush. The toothbrush handle 10 is provided with the hollow fixing column 12 therein, which is located at the lower end of the toothbrush handle 10, the fixing column 12 is used to fix the main machine 30 of the electric toothbrush. The bottom of the fixing column 12 defines the mounting hole 121, and the main machine 30 includes: a shaft core 31. The main machine 30 is inserted into the mounting hole 121 through the shaft core 31, and the mounting hole 121 is the same size as the shaft core 31 for easy installation. The middle part of the fixing column 12 is provided with the elastic sheet 122, the elastic sheet 122 is used to compress the shaft core 31 of the main machine 30, in order to transmit power from the shaft core 31.

In the embodiment, the elastic sheet 122 is provided with elastic sheet protrusions 1221 thereon.

The elastic sheet 122 is provided with the elastic sheet protrusions 1221, the elastic sheet protrusions 1221 play a role of generating friction between the elastic sheet protrusions 1221 and a slot of the shaft core 31 of the main machine 30 to prevent the toothbrush head 20 from detaching from the shaft core 31 during vibration.

In an embodiment, two sides of the elastic sheet 122 are provided with hollow structures.

In an embodiment, the hollow structures 1222 at the two sides of the elastic sheet 122 are filled with a soft TPE 1223.

The two sides of the elastic sheet 122 are provided with hollow structures, making it easy for the elastic sheet 122 to deform elastically and produce elasticity. The hollow structures 1222 at the two sides of the elastic sheet 122 are filled with the soft TPE 1223, ensuring that the appearance of the toothbrush replacement head 100 is complete and beautiful, while keeping the elastic sheet 122 flexible.

Figure 2:
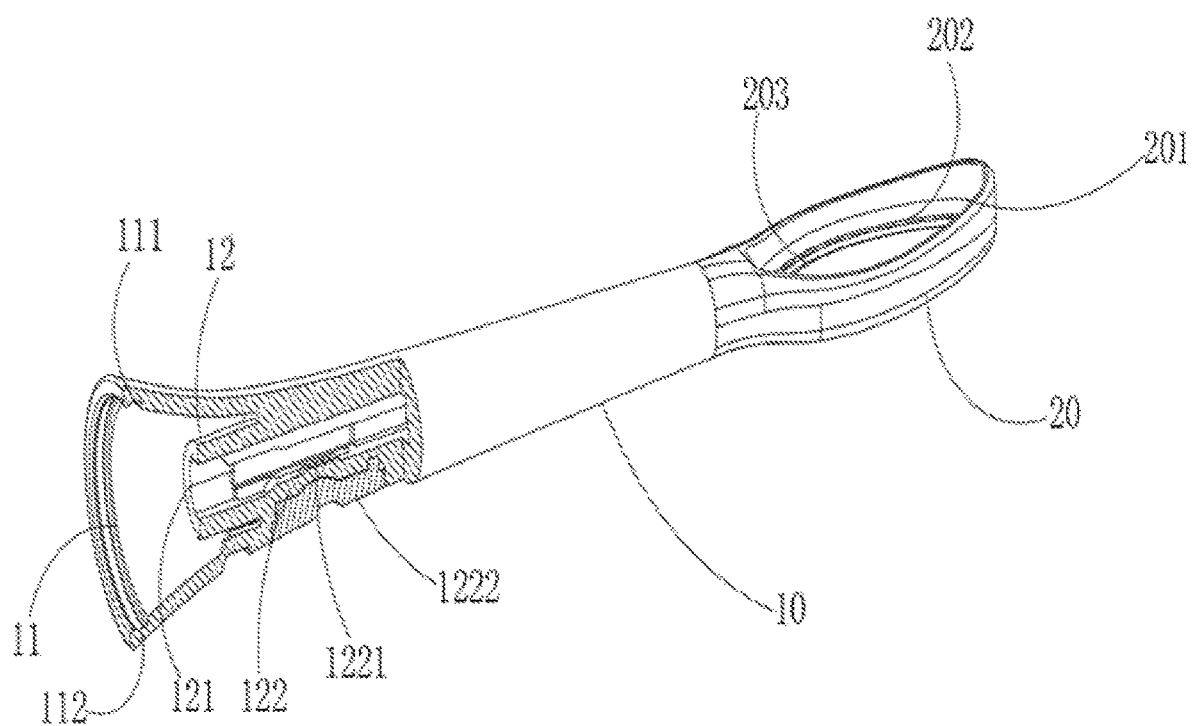
FIG. 2 illustrates another schematic structural diagram of the electric toothbrush replacement head device in the embodiment of the disclosure.
Figure 4:
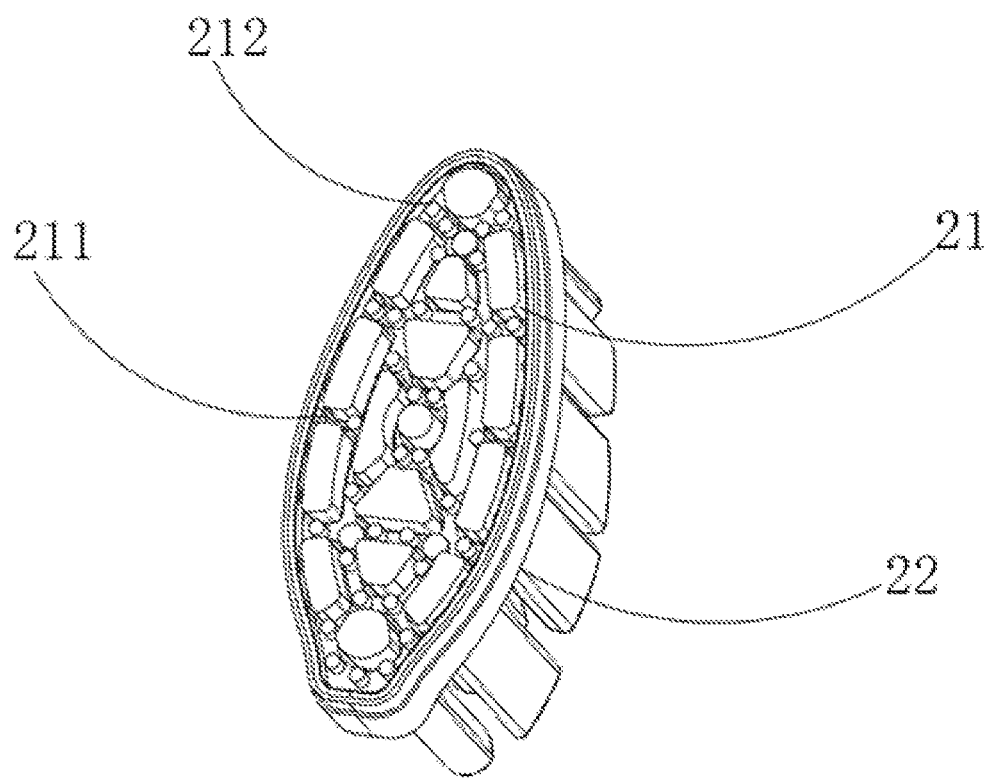
FIG. 4 illustrates a schematic structural diagram of a brush component of the electric toothbrush replacement head device in the embodiment of the disclosure.

In the embodiment, as shown in FIGS. 1, 2 and 4, the brush component 21 defines inserting bristle holes 211 and includes fused adhesive columns 212.

Figure 3:
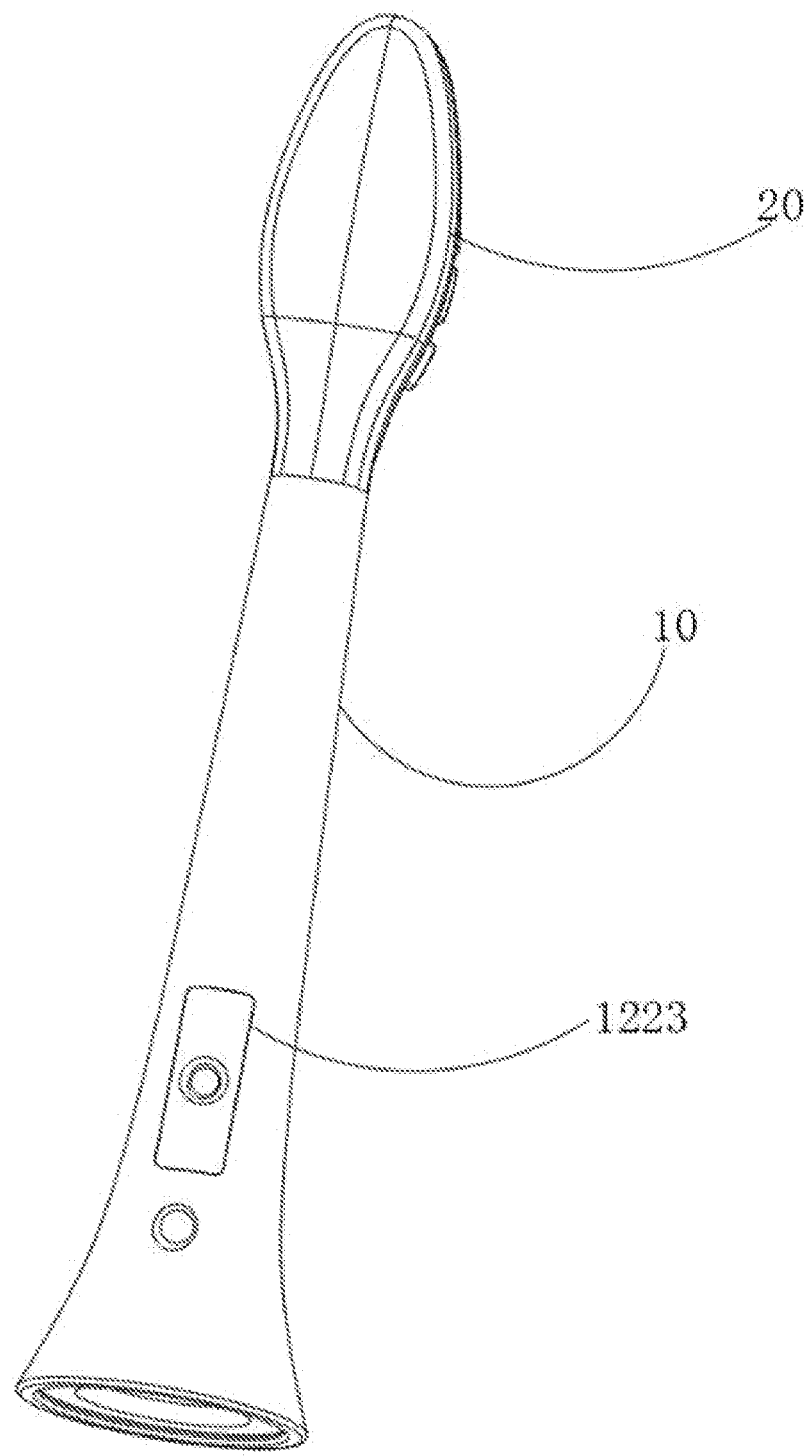
FIG. 3 illustrates still another schematic structural diagram of the electric toothbrush replacement head device in the embodiment of the disclosure.

In the embodiment, as shown in FIG. 3, the toothbrush head 20 defines a brush installation slot 201, a size and a shape of the brush installation slot 201 are corresponding to a size and a shape of the brush component 21, and the brush component 21 is disposed inside the brush installation slot 201. And the brush component 21 is fixed on the toothbrush handle by an ultrasonic fusion.

In the embodiment, as shown in FIG. 2, the electric toothbrush replacement head device further comprises: an ultrasonic line 202 disposed in the brush installation slot 201, and the toothbrush head 20 defines an overflow slot 203 located below the ultrasonic line 202.

An upper end of the toothbrush handle 10 defines the brush installation slot 201, the brush installation slot 201 is actually an installation position of the brush component 21. The ultrasonic line 202 is disposed in the brush installation slot 201, the ultrasonic line 202 is used to connect the brush component 21 to the toothbrush handle 10 by the ultrasonic fusion. The toothbrush head 20 defines the overflow slot 203 located below the ultrasonic line 202. The overflow slot 203 can receive excess glue overflowed by the brush component 21 during the ultrasonic fusion, making it easier to install the brush component 21 more smoothly.

In the embodiment, the brush component 21 defines the inserting bristle holes 211, the inserting bristle holes 211 are made into different shapes according to needs. The inserting bristle holes 211 are used to install the bristles 22, and tops of the bristles 22 are made into a shape that fit the teeth, improving the fit and cleaning force. The fused adhesive columns 212 are disposed adjacent to the inserting bristle holes 211, and the bristles 22 inside the inserting bristle holes 211 are fused with the fused adhesive columns 212 by using a hot melt connection to form the brush component 21.

Unlike most current processes on the market that use copper to install the bristles, the brush component 21 uses a copper-free bristle implantation technology to avoid the pollution caused by rusting of copper sheets, which reduces bacterial growth, and ensures safety and hygiene.

Figure 5:
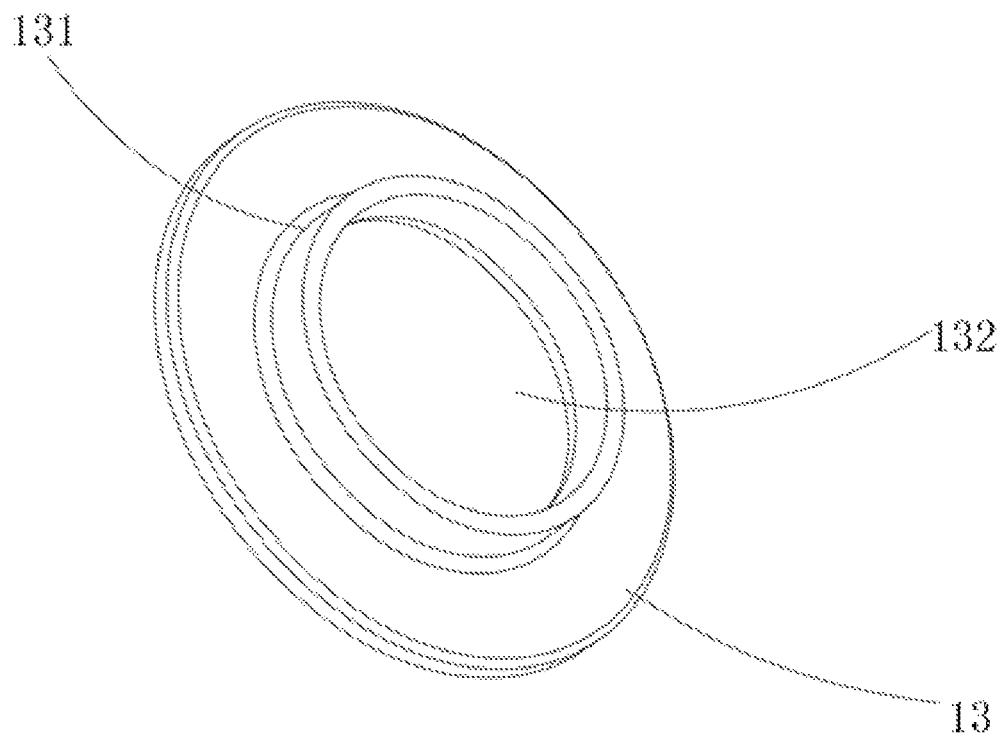
FIG. 5 illustrates a schematic structural diagram of a metal ring in the embodiment of the disclosure.
Figure 6:
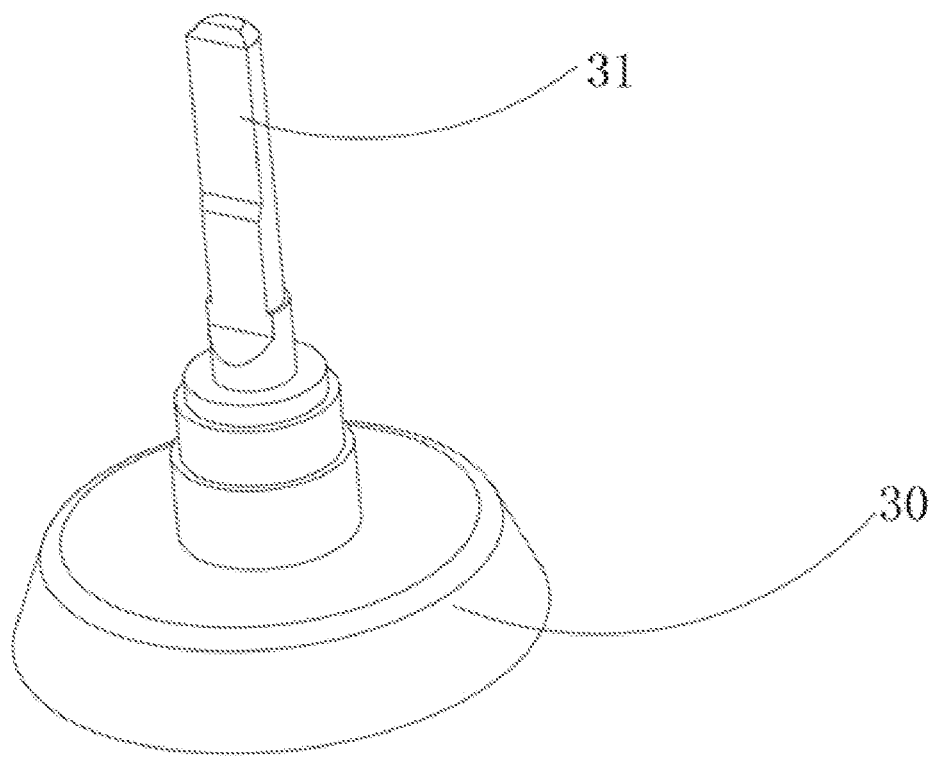
FIG. 6 illustrates a schematic structural diagram of a main machine in the embodiment of the disclosure.

In the embodiment, as shown in FIGS. 2, 5, and 6, a metal ring 13 is disposed on the bottom of the toothbrush handle 10.

The disclosure can transmit the vibration to the bristles 22 through the toothbrush handle 10 utilizing the vibration of the main machine 30, thereby making the bristles 22 to vibrate to realize the cleaning effect on the teeth during the process of brushing teeth.

In the embodiment, the toothbrush replacement head 100 is composed of the toothbrush handle 10, the brush component 21, and the metal ring 13.

The bottom of the toothbrush handle 10 is provided with the metal ring 13, with the aim of increasing the weight of the toothbrush replacement head 100. When the main machine 30 is turned on to use an enhanced vibration mode, the swing amplitude of the toothbrush head 20 is enhanced, which intensifies the swing of the bristles 22 and enhances cleaning power.

In the embodiment, two sides of the bottom hole of the toothbrush handle 11 defines a first clamping slot 111 and a second clamping slot 112, and the metal ring 13 is connected to the bottom hole of the toothbrush handle 11 through the first clamping slot 111 and the second clamping slot 112.

In some embodiment, the bottom hole of the toothbrush handle 11 can define multiple clamping slots, which are disposed at equal distances. An edge of the metal ring 13 is snapped with the multiple clamping slots, making the metal ring 13 more firmly snapped with the bottom hole of the toothbrush handle 11. Therefore, the use of the metal ring 13 is safer and more reliable.

In the embodiment, the metal ring 13 is in a disc shape, and a middle of the metal ring 13 is provided with a circular table 131, the circular table 131 defines a through hole 132, and two ends of the metal ring 13 are respectively connected to the first clamping slot 111 and the second clamping slot 112 at the two sides of the bottom hole of the toothbrush handle 11 in a snap-fit manner, thereby connecting the metal ring 13 and the bottom hole of the toothbrush handle 11.

The through hole 132 of the metal ring 13 is configured for more convenient installation of the shaft core 31 of the main machine 30.

When the main machine 30 is connected to the toothbrush replacement head 100 of the disclosure, the metal ring 13 is disposed on the bottom of the toothbrush handle 10 to better stabilize the shaft core 31 and achieve better teeth cleaning effect.

When using the electric toothbrush, the toothbrush replacement head 100 is disposed on main machine 30 of the electric toothbrush, and the shaft core 31 on the main machine 30 is inserted into the mounting hole 121 of the toothbrush handle 10. The mounting hole 121 is tightly matched with the shaft core 31 for installation. When the main machine 30 is turned on, power is output from the shaft core 31 and transmitted to the toothbrush handle 10 through a connection surface between the mounting hole 121 and the shaft core 31. The toothbrush handle 10 drives the bristles 22 on the brush component 21 to swing, thereby achieving the goal of cleaning teeth.

The electric toothbrush replacement head device of the disclosure optimizes the original design, has a simpler structure, is more convenient to use, greatly reduces production costs, and has better cleaning effects.

The above is only an optional embodiment of the disclosure and do not limit its scope. Any equivalent structural changes made using the description and attached drawings of the disclosure, or direct/indirect applications in other related technical fields, are included in the protection scope of the disclosure.

What is claimed is:

1. An electric toothbrush replacement head device, comprising: a toothbrush replacement head; wherein the toothbrush replacement head comprises: a toothbrush handle and a toothbrush head, a bottom of the toothbrush handle defines a bottom hole, the toothbrush head comprises a brush component, and the brush component comprises bristles; the toothbrush handle is provided with a hollow fixing column therein located at a lower end of the toothbrush handle, a middle part of the fixing column is provided with an elastic sheet, a side of the elastic sheet is provided with a hollow structure, and the hollow structure is filled with a thermoplastic rubber (TPE), and the TPE is disposed to be direct contact with the elastic sheet; the elastic sheet comprises an arc-shaped part, the arc-shaped part of the elastic sheet is provided with elastic sheet protrusions thereon, and the elastic sheet protrusions are configured to be attached to a shaft core of a main machine, and a bottom of the fixing column defines a mounting hole.

2. The electric toothbrush replacement head device as claimed in claim 1, wherein the brush component defines inserting bristle holes, and comprises: fused adhesive columns.

3. The electric toothbrush replacement head device as claimed in claim 2, wherein the toothbrush head defines a brush installation slot, a size and a shape of the brush installation slot are corresponding to a size and a shape of the brush component, and the brush component is disposed inside the brush installation slot.

4. The electric toothbrush replacement head device as claimed in claim 1, wherein the electric toothbrush replacement head device further comprises: an ultrasonic line disposed in the brush installation slot, and the toothbrush head defines an overflow slot located below the ultrasonic line.

5. The electric toothbrush replacement head device as claimed in claim 1, wherein a metal ring is disposed on the bottom of the toothbrush handle.

6. The electric toothbrush replacement head device as claimed in claim 5, wherein the toothbrush handle defines clamping slots located at two sides of the bottom hole, and the metal ring is snapped into the clamping slots.

7. The electric toothbrush replacement head device as claimed in claim 6, wherein the metal ring is in a disc shape, and the metal ring is provided with a circular table, the circular table defines a through hole, and two ends of the metal ring are respectively snapped into the clamping slots at the two sides of the bottom hole.

8. An electric toothbrush replacement head device, comprising:
a toothbrush handle, defining a bottom hole and comprising: a housing, a hollow fixing column and an elastic sheet; wherein the hollow fixing column comprises: a first part and a second part connected with the first part, the second part is disposed in the housing and surrounded by the housing, and the second part defines a gap with the housing and the gap surrounds the second part; the elastic sheet is disposed on the first part of the hollow fixing column, and configured to abut against a shaft core of a main machine; and the elastic sheet comprises: an arc-shaped part;
a toothbrush head, disposed on the toothbrush handle; wherein the toothbrush head defines a brush installation slot and an overflow slot;
elastic sheet protrusions, disposed on the arc-shaped part of the elastic sheet; wherein the elastic sheet protrusions are configured to abut against a shaft core of a main machine;
a brush component, disposed in the brush installation slot, and comprising: bristles and fused adhesive columns; wherein the bristles are connected to the fused adhesive columns though a hot melt connection process;
an ultrasonic line, disposed in the brush installation slot and surrounding the brush component; wherein the overflow slot is located below the ultrasonic line; and
a metal ring, disposed at a bottom of the toothbrush handle through the bottom hole, and snapped into the housing.

9. The electric toothbrush replacement head device as claimed in claim 8, wherein the brush component defines inserting bristle holes configured to install the bristles, and the fused adhesive columns are disposed adjacent to the inserting bristle holes.

10. The electric toothbrush replacement head device as claimed in claim 8, wherein the hollow fixing column is located at a top of the bottom hole.

11. The electric toothbrush replacement head device as claimed in claim 8, wherein a side of the elastic sheet is provided with a hollow structure, the hollow structure is filled with TPE, and the TPE is disposed to be direct contact with the elastic sheet.

12. The electric toothbrush replacement head device as claimed in claim 8, wherein the toothbrush handle defines clamping slots located at a side of the bottom hole, and the metal ring is snapped into the clamping slots.

13. The electric toothbrush replacement head device as claimed in claim 8, wherein the metal ring is in a disc shape, and the metal ring is provided with a circular table thereon, the circular table defines a through hole configured for the shaft core of the main machine to pass through, and the metal ring is snapped into the clamping slots.

14. The electric toothbrush replacement head device as claimed in claim 8, wherein the housing, the hollow fixing column and the elastic sheet are integrated into an inseparable structure.

15. An electric toothbrush replacement head device, comprising: a toothbrush replacement head; wherein the toothbrush replacement head comprises: a toothbrush handle and a toothbrush head, a bottom of the toothbrush handle defines a bottom hole, the toothbrush head comprises a brush component, and the brush component comprises bristles; the toothbrush handle is provided with a hollow fixing column therein located at a lower end of the toothbrush handle, a middle part of the fixing column is provided with an elastic sheet, the elastic sheet comprises an arc-shaped part, the arc-shaped part of the elastic sheet is provided with elastic sheet protrusions thereon, and the elastic sheet protrusions are configured to be attached to a shaft core of a main machine, and a bottom of the fixing column defines a mounting hole; and
wherein the toothbrush handle further comprises: a housing; the hollow fixing column comprises: a first part and a second part integrated with the first part, the first part is connected with the housing, the second part is disposed in the housing and surrounded by the housing, and the second part defines a gap with the housing and the gap surrounds the second part.

16. The electric toothbrush replacement head device as claimed in claim 15, wherein the housing, the hollow fixing column and the elastic sheet are integrated into an inseparable structure.

* * * * *